US011943829B2

(12) United States Patent
Richards

(10) Patent No.: US 11,943,829 B2
(45) Date of Patent: *Mar. 26, 2024

(54) METHOD FOR ESTABLISHING A CONNECTION BETWEEN A NEUTRAL HOST NETWORK AND ONE OR MORE VIRTUAL RADIO ACCESS NETWORKS

(71) Applicant: Sago Strategic Solutions LLC, Wilmington, DE (US)

(72) Inventor: Christopher Richards, Ottawa (CA)

(73) Assignee: Sago Strategic Solutions LLC, Wilmington, DE (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/541,392

(22) Filed: Dec. 3, 2021

(65) Prior Publication Data
US 2022/0095402 A1    Mar. 24, 2022

Related U.S. Application Data

(63) Continuation of application No. 16/619,663, filed as application No. PCT/IB2018/054062 on Jun. 6, 2018, now Pat. No. 11,343,868.
(Continued)

(51) Int. Cl.
*H04W 76/16* (2018.01)
*H04L 1/00* (2006.01)
(Continued)

(52) U.S. Cl.
CPC .......... *H04W 76/16* (2018.02); *H04L 1/0026* (2013.01); *H04L 5/001* (2013.01);
(Continued)

(58) Field of Classification Search
CPC . H04W 76/16; H04W 72/23; H04W 28/0247; H04W 28/18; H04W 48/16;
(Continued)

(56) References Cited

U.S. PATENT DOCUMENTS 91,315,262        12/2013  Adrien
11,343,868 B2 *    5/2022  Richards ............... H04W 48/16
(Continued)

FOREIGN PATENT DOCUMENTS

JP     2015524186 A      8/2015
WO    20131700452 A2    11/2013
(Continued)

OTHER PUBLICATIONS

E. Westerberg, "4G/5G RAN architecture How a Split Can Make the Difference", Ericsson Technology Review, Charting The Future of Innovation vol. 93 #6 . 2016.
(Continued)

*Primary Examiner* — Jael M Ulysse
(74) *Attorney, Agent, or Firm* — Thorpe North & Western LLP

(57) ABSTRACT

There is provided a method for establishing a connection between a Neutral Host (NH) network and one or more virtual radio access networks (vRANs), under a service level agreement (SLA) therebetween. The method comprises: sending a message to the one or more vRANs, the message including an identity of the NH network and at least a first radio parameter; in response to the message, receiving an identity of the one or more vRANs and at least a second radio parameter; and establishing the connection between the NH network and the one or more vRANs, based on the identity of the one or more vRANs, the identity of the NH network and one of the at least first radio parameter and the at least second radio parameter. The method is implemented in a network node, such as a Distributed Unit of a gNB.

20 Claims, 11 Drawing Sheets

Related U.S. Application Data

(60) Provisional application No. 62/515,838, filed on Jun. 6, 2017.

(51) Int. Cl.

| | | |
|---|---|---|
| *H04L 5/00* | (2006.01) | |
| *H04W 28/02* | (2009.01) | |
| *H04W 28/18* | (2009.01) | |
| *H04W 48/16* | (2009.01) | |
| *H04W 72/23* | (2023.01) | |
| *H04W 74/0833* | (2024.01) | |
| *H04W 88/08* | (2009.01) | |

(52) U.S. Cl.
CPC ....... *H04W 28/0247* (2013.01); *H04W 28/18* (2013.01); *H04W 48/16* (2013.01); *H04W 72/23* (2023.01); *H04W 74/0833* (2013.01); *H04W 88/085* (2013.01)

(58) Field of Classification Search
CPC ............ H04W 74/0833; H04W 88/085; H04L 1/0026; H04L 5/001
See application file for complete search history.

(56) References Cited

U.S. PATENT DOCUMENTS

| | | | |
|---|---|---|---|
| 11,477,703 B2 * | 10/2022 | Xu | ................ H04W 76/11 |
| 2013/0303114 A1 | 11/2013 | Ahmad | |
| 2014/0025819 A1 | 1/2014 | Lorang | |
| 2014/0086177 A1 | 3/2014 | Adjakple | |
| 2014/0301192 A1 | 10/2014 | Lee | |
| 2014/0348137 A1 | 11/2014 | Kanodia | |
| 2015/0063166 A1 | 3/2015 | Sif | |
| 2015/0264616 A1 | 9/2015 | Chen | |
| 2015/0280980 A1 | 10/2015 | Bitar | |
| 2016/0100331 A1 | 4/2016 | Ahmavaara | |
| 2017/0207947 A1 | 7/2017 | Marom | |
| 2017/0373932 A1 | 12/2017 | Subramanian | |
| 2017/0374706 A1 | 12/2017 | Sharma | |
| 2018/0131570 A1 | 5/2018 | Lee | |
| 2018/0189258 A1 | 7/2018 | Bhaya | |
| 2018/0324752 A1 * | 11/2018 | Kim | ................ H04W 68/02 |
| 2019/0159086 A1 * | 5/2019 | Xu | .................. H04L 67/12 |
| 2019/0297654 A1 * | 9/2019 | Chen | .................. H04L 1/1819 |
| 2019/0342809 A1 * | 11/2019 | Kim | ................ H04W 36/0058 |
| 2020/0045591 A1 * | 2/2020 | Yokoyama | ............. H04W 8/20 |
| 2021/0112463 A1 * | 4/2021 | Xu | .................. H04W 36/0033 |

FOREIGN PATENT DOCUMENTS

| | | | | |
|---|---|---|---|---|
| WO | WO-2013170045 A2 * | 11/2013 | ......... | H04L 12/1407 |
| WO | 2017070635 A1 | 4/2017 | | |
| WO | 20170706351 A1 | 4/2017 | | |
| WO | WO-2017070635 A1 * | 4/2017 | ......... | G06F 9/45558 |

OTHER PUBLICATIONS

J. Wang et al, "I-NET: New Network Architecture For 5G Networks", IEEE Communications Magazine—Communications Standards Supplement, Jun. 2015.

T. Metsch, "D3.1 Infrastructure Management Foundations—Specifications & Design for Mobile Cloud framework", MCN Mobile Cloud Networking, Seventh Framework Programme, Future Communication Architecture for Mobile Cloud Services, Project No. 318109, Integrated Project FP7-ICT-2011-8, Nov. 8, 2013.

\* cited by examiner

METHOD FOR ESTABLISHING A CONNECTION BETWEEN A NEUTRAL HOST NETWORK AND ONE OR MORE VIRTUAL RADIO ACCESS NETWORKS

RELATED APPLICATIONS

The present application claims the benefits of priority of U.S. Provisional Patent Application No. 62/515,838, entitled "Neutral Host support in vRAN", and filed at the United States Patent and Trademark Office on Jun. 6, 2017, the content of which is incorporated herein by reference.

TECHNICAL FIELD

The present description generally relates to wireless communication networks and more particularly to virtual Radio Access Networks (vRAN).

BACKGROUND

A significant cost for network operators when deploying small cells is the cost of site access and site internet connectivity. Studies have shown that these costs are the main barrier to deploying many small cells. One solution is to share those costs across a number of network operators. This is the approach of Distributed Antenna Systems (DAS). However, for non DAS systems, methods of supporting the deployment of many small cells are currently complex and expensive. A solution that allows cost effective sharing of Radio access network (RAN) infrastructure across many networks and service providers is highly desirable.

Virtual Radio Access Network (vRAN) is a network architecture for Long Term Evolution (LTE) that allows functional and physical separations of the LTE protocol stacks. As such, the functions of transport and control, within an eNodeB or base station, are separated into two distinct physical entities. For example, vRAN has been introduced and described in U.S. Pat. No. 9,131,526 B2.

A similar protocol stack split is defined for 3GPP and 5 Generation (5G) New Radio (NR). It is also applicable for Multefire networks. A new interface is defined, which is the interface between the Radio Control Function (RCF) entity and the Baseband Processing Function (BPF) entity. This interface is being standardized by 3GPP in Release 15 (Rel. 15) and is referred to as the "F1" interface. As a note, 3GPP is also currently deciding if the F1 interface can also be used for 4G LTE as well as 5G NR.

The separation of the upper and lower LTE or 5NR protocol stack with the defined interface allows a separation of ownership, administrative and management domains of the radio access points (e.g. BPF, radio unit) and vRAN functions (e.g. Packet Processing Function (PPF), RCF). This means that one entity may provide and manage the BPF, or the radio unit equipment and resources, which can be used by many different service providers (e.g. Mobile Network Operators (MNO)) by connecting their vRAN RCF and PPF functions. This is termed "Neutral Host" (NH).

Neutral host (NH) providers are entities that plan, install and run the RAN but do not have their own subscribers and (usually) do not own their own radio spectrum licenses. Instead they lease their network capabilities to other wireless service providers. For example, a sport stadium neutral host provider can lease its network to one or more wireless service providers such as existing MNOs (e.g. Rogers™) or Boingo™ or even non-traditional MNOs such as Google™.

SUMMARY

At least the following problems may be envisioned:
Currently, vRAN does not support NH or Multi-operator networks.
Currently there is no specification for NH or multi-operator information exchange over the F1 interface.
The same problems apply to Multefire networks.
Certain aspects and their embodiments of the present disclosure may provide solutions to these or other problems.
Embodiments of this disclosure allow to support NH network with vRANs.

According to a first aspect, there is provided a method for establishing a connection between a Neutral Host (NH) network and one or more virtual radio access networks (vRANs), under a service level agreement (SLA) therebetween. The method comprises: sending a message to the one or more vRANs, the message including an identity of the NH network and at least a first radio parameter; in response to the message, receiving an identity of the one or more vRANs and at least a second radio parameter; and establishing the connection between the NH network and the one or more vRANs, based on the identity of the one or more vRANs, the identity of the NH network and one of the at least first radio parameter and the at least second radio parameter.

In some embodiments, the at least first parameter comprises a radio capability of the NH network and the at least second parameter comprises a radio capability of the one or more vRANs.

In some embodiments, the radio capability of the one or more vRANs comprises one or more of: one or more carrier frequencies; a carrier bandwidth; a number of antenna ports; a plurality of channel numbers; a Block Error Rate (BLER) target; a Physical Cell Identity (PCI); and a Random Access Channel (RACH) preamble.

In some embodiments, the radio capability of the NH network comprises one or more of: a carrier frequency range; a carrier bandwidth; a number of carriers; an occupied bandwidth (OBW); a Radio Link Control (RLC) mode; an instantaneous bandwidth (IBW); and a maximum output power (OP).

According to second aspect, some embodiments include a network node configured, or operable, to perform one or more functionalities (e.g. actions, operations, steps, etc.) of the network node such as: send a message to the one or more vRANs, the message including an identity of the NH network and at least a first radio parameter; in response to the message, receive an identity of the one or more vRANs and at least a second radio parameter; and establish the connection between the NH network and the one or more vRANs, based on the identity of the one or more vRANs, the identity of the NH network and one of the at least first radio parameter and the at least second radio parameter as described herein.

In some embodiments, the network node may comprise processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

Some embodiments may enable or provide one or more technical advantages, including:
- Allow NH and Multi-Operator (MO) information to be included in the control and user plane signalling over the interface F1. For example, in the control plane, the NH and MO information is shared between the cRBU and RCF and between the RCF and PPF; in the user plane, the NH and MO information is shared between the cRBU and PPF.
- The sharing of the same information (which could be in a different physical format) is applicable for Multefire, 4G LTE and 5G NR networks.
- The solution applies both to licensed and unlicensed and shared spectrum.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 1:
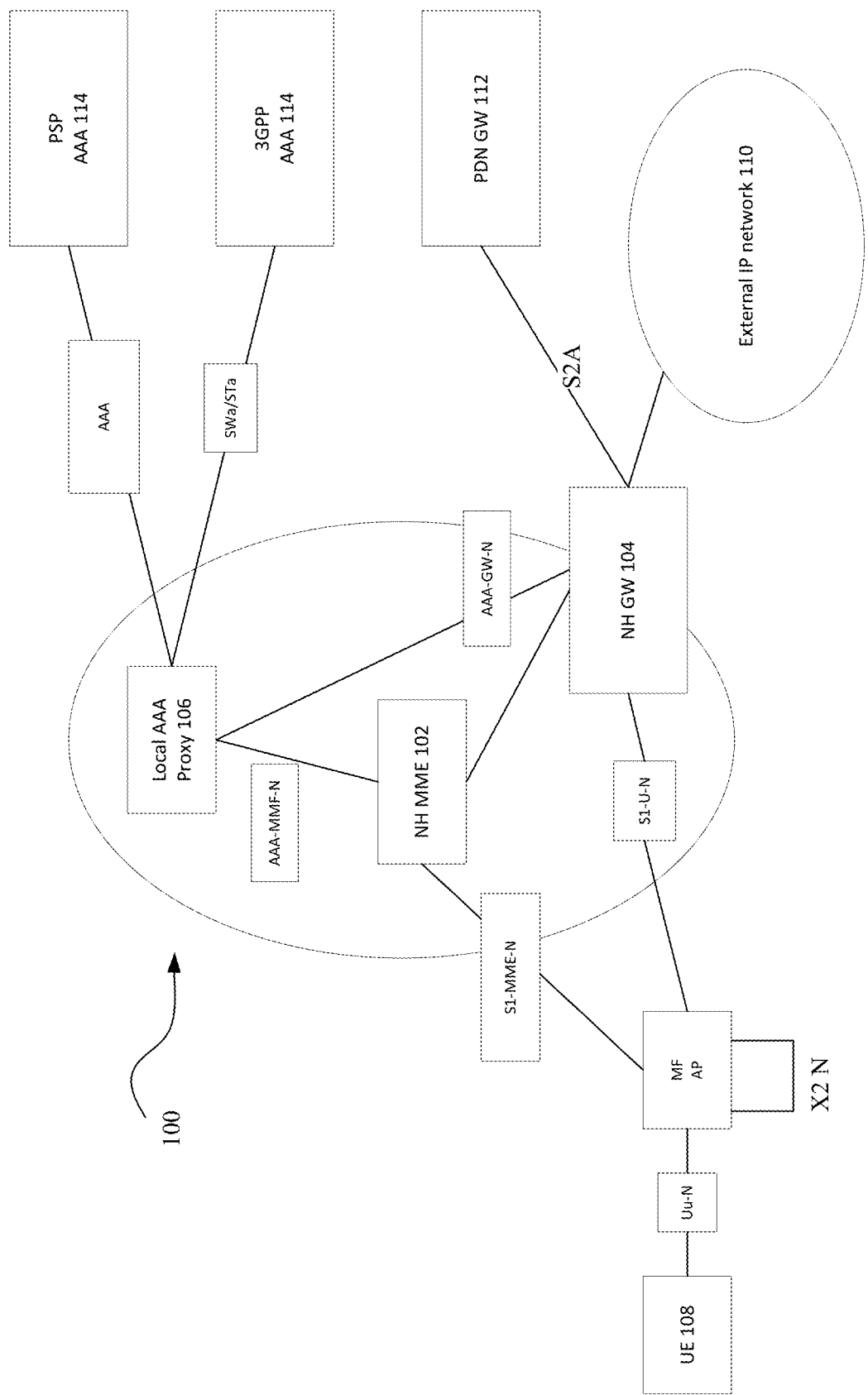
FIG. 1 is a schematic illustration of a Neutral Host core network.

As mentioned above, current vRAN systems do not support NH. One solution is to deploy NH or Multi-Operator networks which require the NH provider to also deploy a full 3GPP Evolved Packet Core (EPC). As shown in FIG. 1, a NH network 100 is shown. The NH network 100 has many functions of the EPC, e.g. Mobility Management Entity (MME) 102, a NH gateway (NH GW) 104, a local Authentication Authorization and Accounting (AAA) proxy 106, etc. The NH network 100 may be connected to a User Equipment (UE) 108, an external IP network 110, a PDN gateway 112 and different AAAs 114 through different interfaces that are well-known in the art. While this is feasible for some large NH providers, there are many scenarios where it is not technically possible or economically feasible, i.e. many NH providers are not in the business of being network operators. Therefore, there is a need to provide solution for current vRAN systems to support NH in a simple way.

Embodiments of the present disclosure allow the current vRAN systems to support NH and Multi-Operator networks by providing new signaling messages over the F1 interface. For example, specific information can be exchanged between the functions of RCF and BPF.

Before going into detail of the present embodiments, a description of the split architecture for the NR network is provided.

Figure 2:
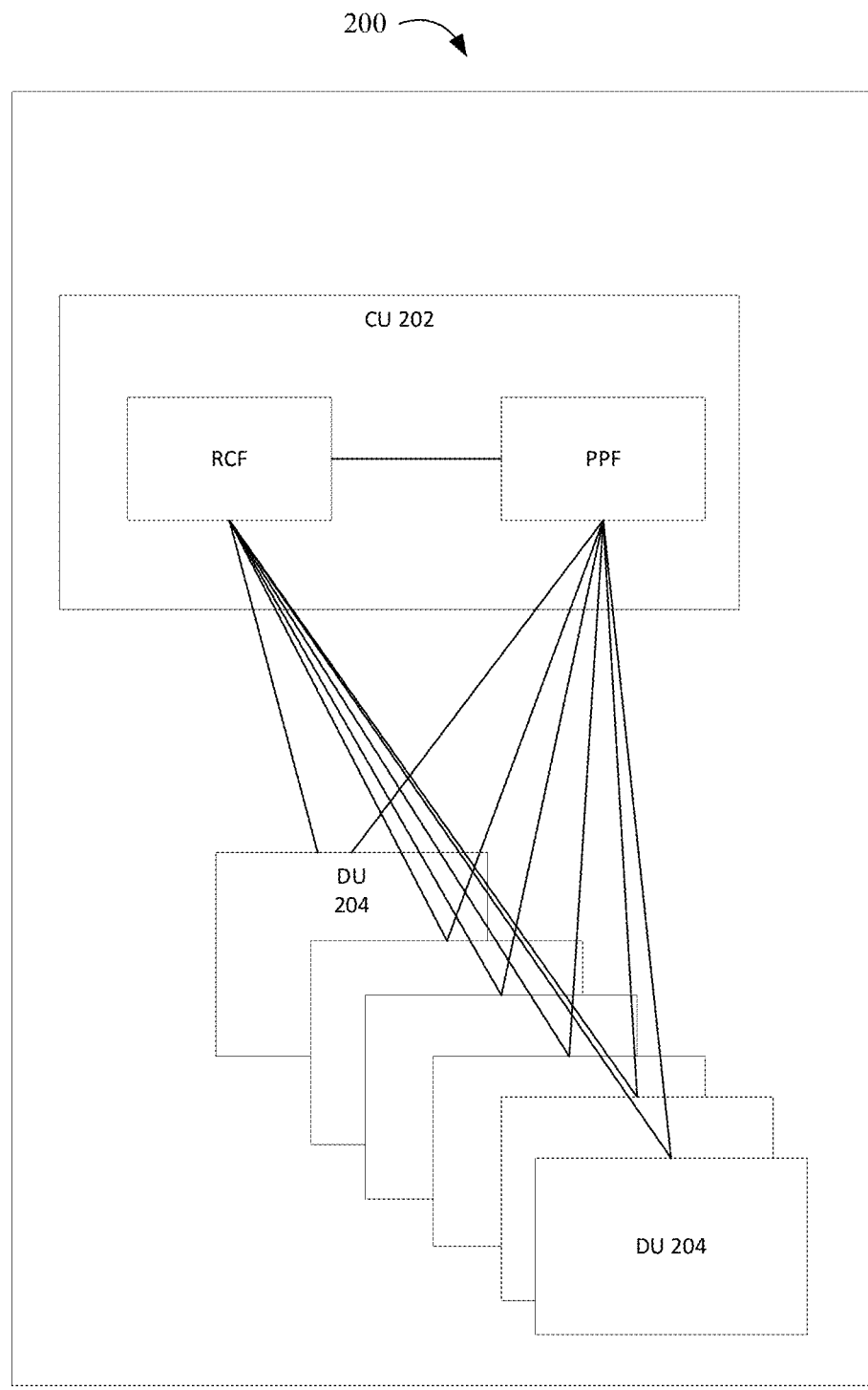
FIG. 2 is an illustration of a gNB with functional and physical separations.

FIG. 2 illustrates a gNB 200 that implements the separation of functional and physical separation of the 5G or NR protocol stacks. The gNB 200 is represented by a Centralized Unit (CU) 202 and a plurality of decentralized units (DU) 204. The CU 202 may comprise the functions of PPF that may include the Packet Data Convergence Protocol (PDCP) function. The CU 202 may also comprise the function of Radio Resource Control (RRC) and/or RCF, for example. The DU 204 may comprise the functions of Layer 1 and Layer 2, such as Radio Link Control (RLC), Media Access Control (MAC) and physical layer (PHY). The interface defined between the CU and DU is the F1 interface. The gNB 200 can be connected to another gNB through the X2 interface. It can be also connected to a network node, such as a MME, through the interface S1. The NG and Xn interfaces are the 5G equivalent interfaces of 4G interfaces S1 and X2 respectively. It should be noted that using a split architecture, the CU 202 and the DUs 204 of a gNB 200 can belong to different network owners.

It should be noted that in this disclosure, the following terms BPU (Baseband processing unit), cRBU (cloud connected RBU) and RBU (Remote Baseband Unit) are equivalent of a DU and as such these terms can be interchangeably used. Also, RCF (Radio Control Function) can be interchangeably used with vRC (virtual Radio Control). And PPF (Packet Processing Function) can be interchangeably used with vPP (virtual Packet Processing).

Figure 3:
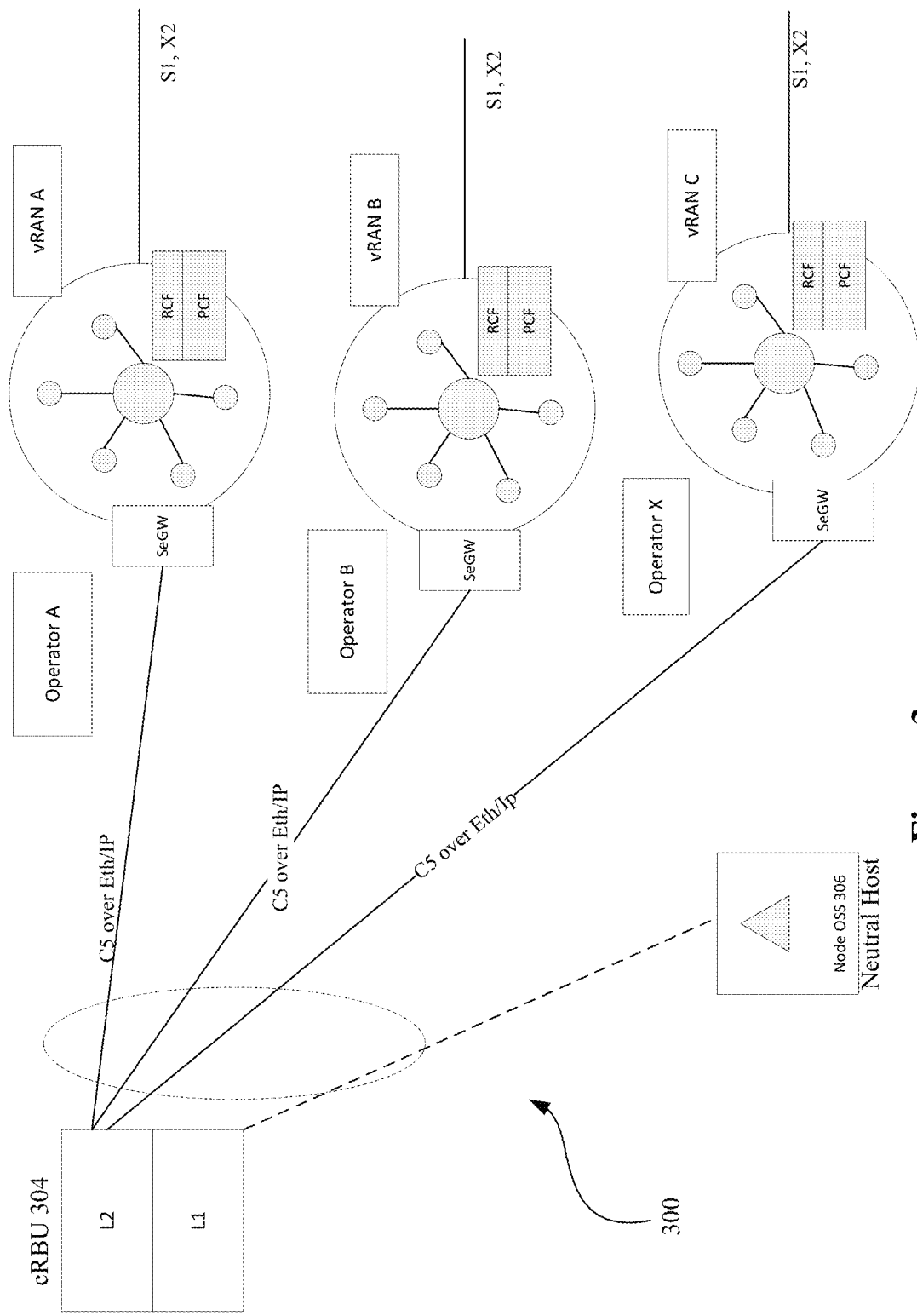
FIG. 3 illustrates a schematic diagram of a communication network with a NH connected to a plurality of operator networks, according to an embodiment.

For example, FIG. 3 illustrates an architecture of a communication network 300, using the split architecture for NR, according to an embodiment, which allows a single cRBU (e.g. a DU of a gNB), belonging to a NH network, to be shared by and/or connected to a plurality of operators' networks. As shown in FIG. 3, the cRBU 304, which comprises the functions of layers 1 and 2, is connected to operator A, operator B and operator X's network. Each operator has a vRAN, for example. The cRBU 304 is connected to the vRAN of each operator using the interface C5, which is equivalent to the interface F1. The cRBU 304 may be connected to the OSS node 306 of the NH network as well.

Figure 4:
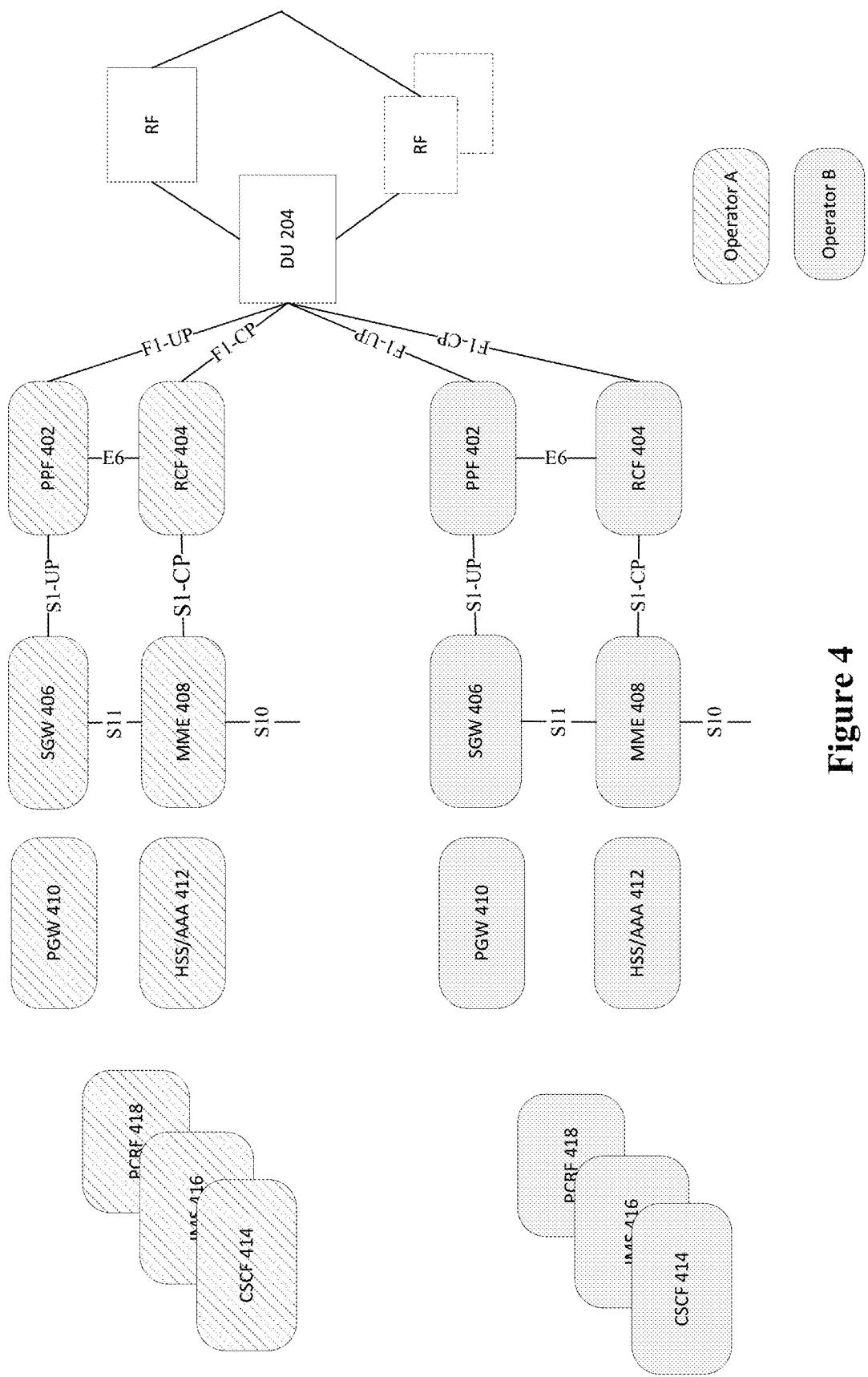
FIG. 4 illustrates another schematic diagram of a communication network with a NH connected to a plurality of operator networks, according to an embodiment.

FIG. 4 shows the same architecture as in FIG. 3, but with more details regarding the operators' networks. For example, a DU 204 (e.g. a cRBU) is connected to the network of operators A and B (or service providers A and B). More specifically, the DU 204 is connected, through the interface F1, to a PPF 402 and RCF 404 of each operator's network respectively. Furthermore, the PPF 402 is connected to the RCF 404 via the interface E6. It should be noted that the other elements of the operators' networks, such as a SGW 406, MME 408, PGW 410, HSS/AAA 412, CSCF 414, IMS 416, PCRF 418, etc., are well-known in the art and will not be described further.

Figure 5:
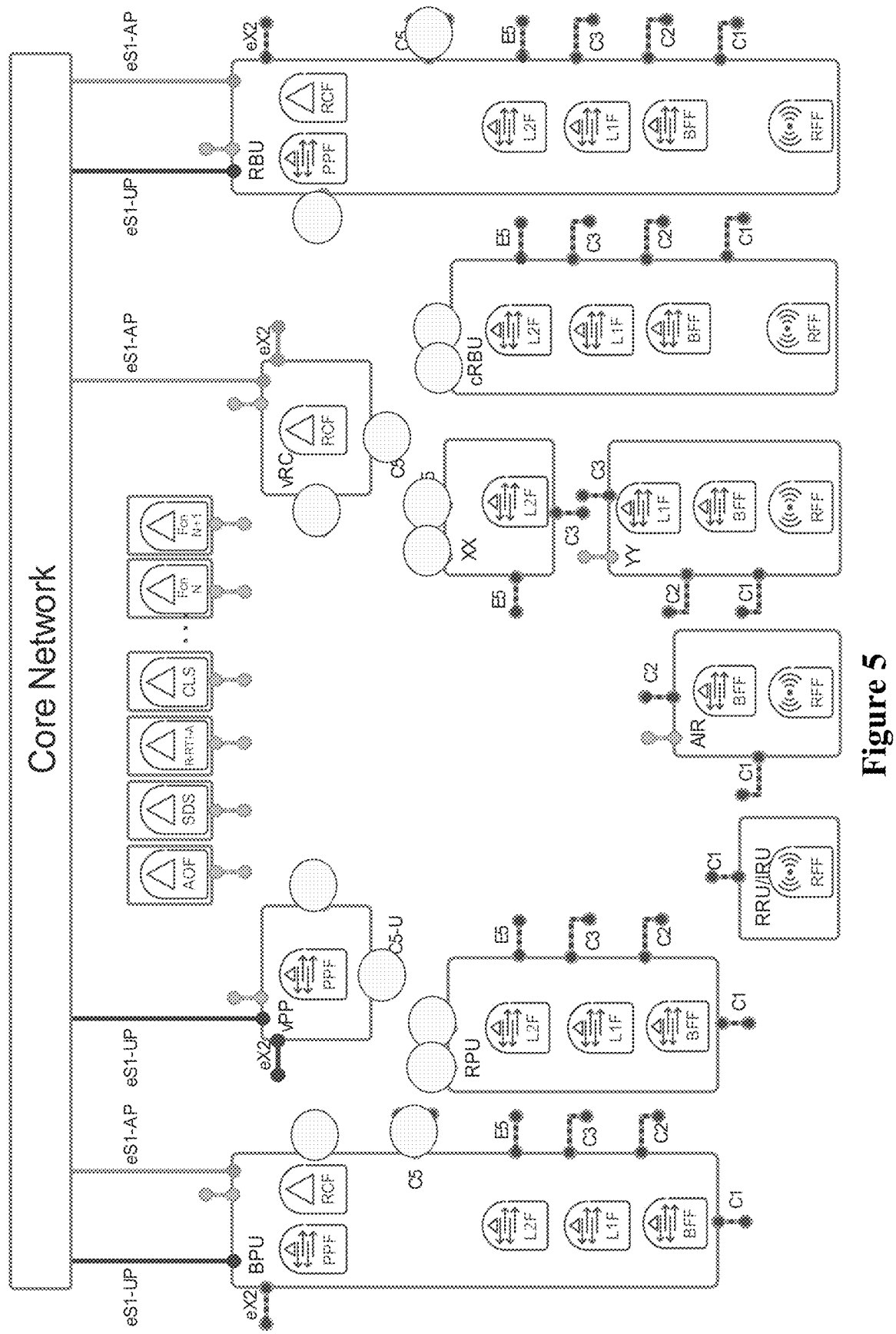
FIG. 5 illustrates the split architecture for NR.

FIG. 5 illustrates the split architecture for NR with different functions, according to an embodiment. The core network is connected to CUs 202 such as a virtual Packet Processing (vPP) and a virtual Radio Control (vRC), which are separate from the Radio Baseband Units (cRBU). The vPP may comprise a PPF and the vRC may comprise a RCF. The interface between the vRC/vPP and the cRBU is the F1 interface, which is equivalent to the C5 interface as shown in FIG. 3. It should be noted that a cRBU can be connected to many PPF/RCF instances, of the same or different operators. Furthermore, the core network can be connected to a Radio Baseband Unit (RBU) and/or a Baseband Processing Unit (BPU), which do not have the split architecture. In this case, the RBU and BPU are part of a conventional gNB or eNB.

As mentioned above, this disclosure allows vRAN systems to support NH and MO as shown in FIGS. 3-5 where many PPF/RCF instances of the same or different operators share the resources of one or more cRBUs. To do so, a plurality of new messages (or signals) is communicated between different nodes of FIG. 5, over the F1 interface and the E6 interface, during the connection establishment phase. Alternatively, new information elements in existing messages are communicated over the F1 interface for allowing vRANs systems to support NH and MO.

For example, new messages are indicated, over the F1 interface, in the control plane between a cRBU 304 (or DU 204) and a RCF 404 and between a RCF 404 and a PPF 402 via the E6 interface and in the user place between a cRBU 304 (or DU 204) and a PPF 402. More specifically, NH and MO information/parameters will be included in these messages.

1) As an example, in the control plane, the following parameters can be transmitted over the F1 interface, during the connection establishment phase:

From cRBU 304→RCF 404:
NH-Identifier (NH-ID), for standalone mode (Multefire & standalone NR);
Radio capabilities (frequency range, number, Bandwidth (BW) of carriers, occupied BW (OBW), instantaneous BW (IBW), maximum output power of the radio frequency (max OP), Radio link control (RLC) mode, etc.;
List of other detected cells (identified by physical cell identity (PCI) or downlink reference signal (DRS)) and frequency, BW;
List of supported channels (for 5 GHz and 3.5 GHz);
Channel loads for shared spectrum (for 5 GHz and 3.5 GHz), channel scan configuration;
Statistics: number of collisions, Hybrid automatic repeat request (HARQ) statistics, block error rate (BLER);
List of optional features supported;
Nose Floor (NF) measurements, Energy Detect (ED) level, Received Signal Strength Indicator (RSSI) histogram;
Selected carrier frequency, BW channel number, channel load, etc.

From RCF 4044→cRBU 304:
Radio capabilities: desired carrier frequency(ies), a carrier BW, a number of antenna ports, a plurality of channel numbers, number of HARQ re-transmission, a BLER target, a desired PCI, a random access channel (RACH) preamble, etc.;
Maximum Transmit opportunity (Max TXOP), transmit (TX) power, DRS configuration;
Other system information block (SIB) parameters;
PDCP flow ID map.

Between RCF 404← →PPF 402 through the E6 interface, which is the 3GPP E6 interface:
Packet forwarding Quality of Service (QoS) parameters, e.g. information regarding the priority and scheduling requirements of packets forwarded by the PPF 402 to the cRBU 304 (or DU 204) (and sent from the cRBU 304 to the PPF 402) in order to satisfy any Service Level Agreements (SLA) between the network operator and the Neutral host. Such scheduling requirements could include (but not limited to):
  i. Maximum packet delay or packet buffering limits;
  ii. Ethernet frame and/or IP Packet header quality of service (QoS) (priority) settings;

iii. Maximum Transmission Units (MTU): ethernet frame or IP packet maximum size to transmit requirements needed in order to comply with the SLA.

PDCP flow ID map.

2) As an example, in the user plane, the following parameters can be transmitted over the F1 interface User Plane:

From cRBU 304→PPF 402

Statistics and reports on packet reception, e.g. incoming packet buffer status (for flow control), packet delay and jitter, number of lost packets (packet error rate), number of fragmented packets, etc.;

User Plane capacity exceeded indication (Exceeded/not exceeded).

From PPF 402→cRBU 304

Service Level Agreement (SLA) User Plane parameter list, e.g. information regarding the priority and scheduling requirements of packets forwarded by the cRBU 304 to the PPF 402;

Operator ID, e.g. public land mobile network identity (PLMN-ID);

PDCP flow id map.

It should be noted that the exchange of some of the parameters is optional or conditional to some actions or thresholds. For example, the table (Table 1) below shows some of the parameters that could be set by either by the Service provider (e.g. MNO) of the vRAN or by cRBU 304 of the NH provider.

TABLE 1

| Info | Mandatory (M), Optional (O) or Conditional (C) in F1 signaling | Functions involved | Comments | Standardized or proprietary e.g. 3GPP (F1) or Ericsson (C5) | Wi-Fi Equivalent |
|---|---|---|---|---|---|
| PCI | O | RCF −> BPU | vRAN may inform BPU exactly what PCI to use. But BPU may also decide the PCI locally. Both options needed | | No |
| | O/C | BPU −> RCF | BPU may inform vRAN what PCI was actually used | | No |
| Carrier Frequency | O | | | | |
| Tx Output power | O | | | | |
| PLMN ID | M | RCF −> BPU | Contained in SIB1. Needs to be sent to the BPF by each participating MNO | | |
| Carrier Bandwidth | O | Either | MIB—may be determined locally by BPU, esp in case of shared/unlicensed spectrum | | |
| PHICH configuration | O | either | MIB—may be determined locally by BPU | | |
| RRC config | O | either | SIB2—may be determined locally by BPU, esp in case of shared/unlicensed spectrum | | |
| LAA Info | O | either | Sub-band list, channel list, number of channels, access class list, sharable. If a shared channel is used, then some cell related operations and parameters are only controlled by the RCF, e.g. changing cell state - a service provider/operator can only change the operation of | | |

TABLE 1-continued

| Info | Mandatory (M), Optional (O) or Conditional (C) in F1 signaling | Functions involved | Comments | Standardized or proprietary e.g. 3GPP (F1) or Ericsson (C5) | Wi-Fi Equivalent |
|---|---|---|---|---|---|
| Participating Service Provider ID | C | RCF -> BPU | their sub scribers and broadcast info - not the state of the carrier (e.g. can't lock it) PLMN ID or domain name or . . . PLMN is not the only option | | |

Figure 6:
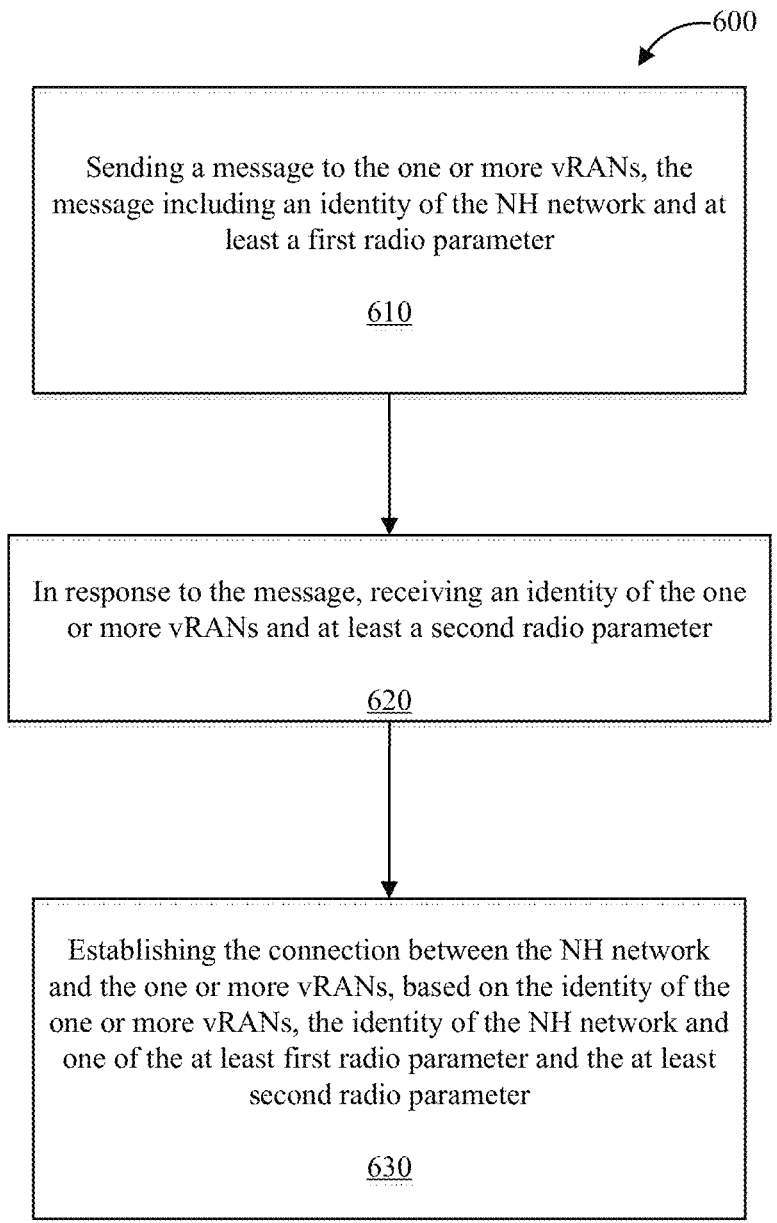
FIG. 6 illustrates a flow chart of a method in a network node, according to an embodiment.

Now, turning to FIG. 6, a method 600 is illustrated for supporting and establishing a connection between a Neutral Host network and one or more virtual radio access networks (vRANs), according to an embodiment. The method can be implemented in a CU 202 (or a RCF/PPF) of a gNB. It should be noted that before the virtual radio access network of one or more network operators can establish a connection with the neutral host network, a service level agreement (SLA) is shared between them and acknowledged by each other. The method 600 starts with sending a message to the one or more vRANs, the message including an identity of the NH network and at least a first radio parameter (block 610). It should be noted that a NH refers to any entity that may provide and manage the BPF, or the radio unit equipment and resources.

Method 600 continues with, in response to the message, receiving an identity of the one or more vRANs and at least a second radio parameter (block 620). Method 600 continues with establishing the connection between the NH network and the one or more vRANs, based on the identity of the one or more vRANs, the identity of the NH network and one of the at least first radio parameter and the at least second radio parameter (block 630).

In other words, the CU 202 part of the gNB can initiate a connection establishment procedure with the one or more vRANs. During the connection establishment procedure, the NH network and the one or more vRANs can exchange their respective identity and one or more radio parameters. The radio parameters may comprise radio capabilities, e.g. a desired carrier frequency, a chosen cell, a carrier bandwidth, etc. Then, the NH network and the one or more vRANs can negotiate the one or more radio parameters. For example, the DU or cRBU can decide which carrier frequency to use, then it can request that desired carrier frequency. In response to the request, the RCF or the vRAN may send the desired carrier frequency to the cRBU. As another example, the cRBU may decide which cell to use. Then, it can indicate to the vRAN the cell that it wants to use. The vRAN will send the PCI in response to that indication.

Once the one or more radio parameters are negotiated, the connection can be established between the NH network and the one or more vRANs, based on the respective identities and the one or more radio parameters. It should be noted that the exchange of radio parameters and identities may be done using one or more messages.

In some embodiments, the at least first parameter may comprise a radio capability of the NH network and the at least second parameter may comprise a radio capability of the one or more vRANs.

In some embodiments, the radio capability of the one or more vRANs may comprise one or more of: one or more carrier frequencies, a carrier bandwidth; a number of antenna ports; a plurality of channel numbers; a Block Error Rate (BLER) target; a Physical Cell Identity (PCI); and a Random Access Channel (RACH) preamble.

In some embodiments, the radio capability of the NH network may comprise one or more of: a carrier frequency range; a carrier bandwidth; a number of carriers; an occupied bandwidth (OBW); a Radio Link Control (RLC) mode; an instantaneous bandwidth (IBW); and a maximum output power (OP).

In some embodiments, the message may further comprise one or more of: a list of detected cells; a list of supported channels; channel loads for shared spectrum; a list of statistics of channel conditions; a Noise Floor (NF) measurements; an Energy Detect (ED) level; and Received signal strength indicator (RSSI) histogram.

In some embodiments, the method may further comprise receiving a maximum transmit opportunity (TXOP); a transmit power; a downlink reference signal (DRS) configuration; and a packet data convergence protocol (PDCP) flow identity map.

In some embodiments, the sending and receiving are performed over a F1 interface between the NH network and the one or more vRANs.

In some embodiments, the at least first radio parameter may be a carrier frequency that the NH network wants to use and wherein receiving the at least second radio parameter may comprise receiving the carrier frequency.

In some embodiments, the at least first radio parameter is a physical cell identity (PCI) that the NH network wants to use and wherein receiving the at least second radio parameter may comprise receiving the PCI.

In some embodiments, sending the message to the one or more vRANs may comprise a request for the at least first parameter and receiving the at least second radio parameter may be in response to the request for the at least first parameter.

Figure 7:
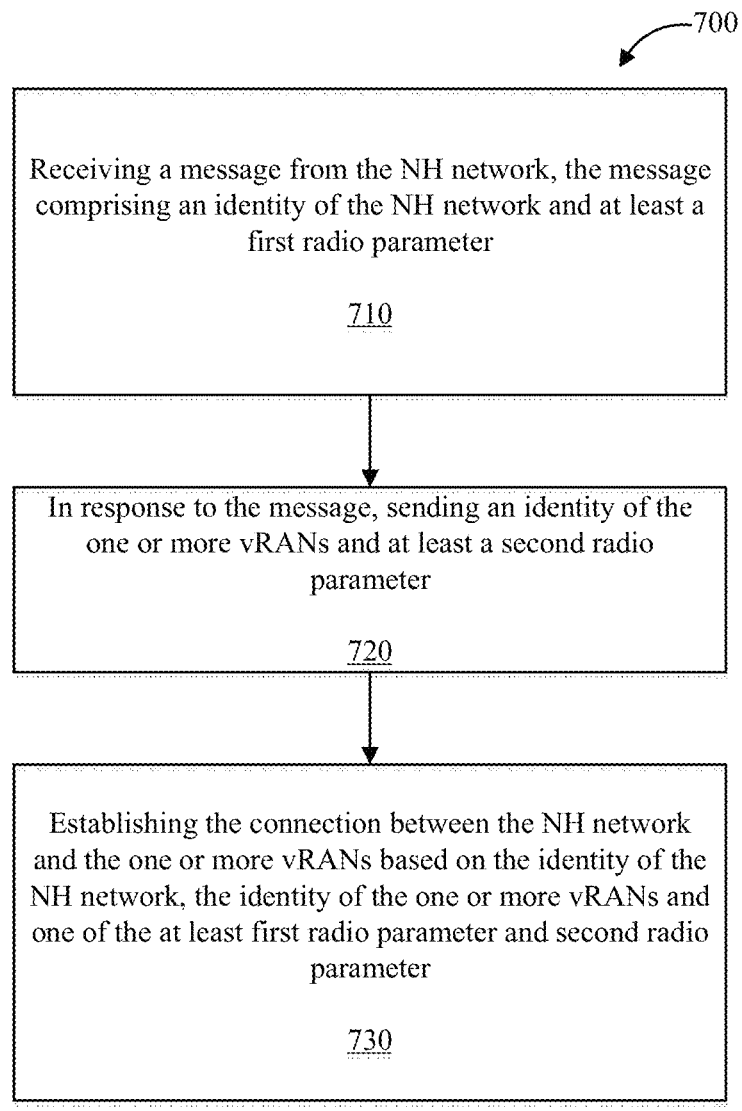
FIG. 7 illustrates another flow chart of a method in a network node, according to an embodiment.

FIG. 7 illustrates a flowchart for a method 700 for supporting and establishing a connection between a Neutral Host network and a virtual radio access network, according to an embodiment. The method can be implemented in a DU 204 (or a cRBU) of a gNB. It should be noted that before the virtual radio access network of a network operator can establish a connection with the neutral host network, a service level agreement (SLA) is shared between them and acknowledged by each other. The method 700 starts with receiving a message from the NH network, the message comprising an identity of the NH network and at least a first radio parameter (block 710). Method 700 continues with, in response to the message, sending an identity of the one or more vRANs and at least a second radio parameter (block 720). Method 700 continues with establishing the connection between the NH network and the one or more vRANs based on the identity of the NH network, the identity of the one or more vRANs and one of the at least first radio parameter and second radio parameter (block 730).

It should be understood that method 600 could be instead performed by a CU and method 700 could be performed by a DU, with respective exchange of information.

Figure 8:
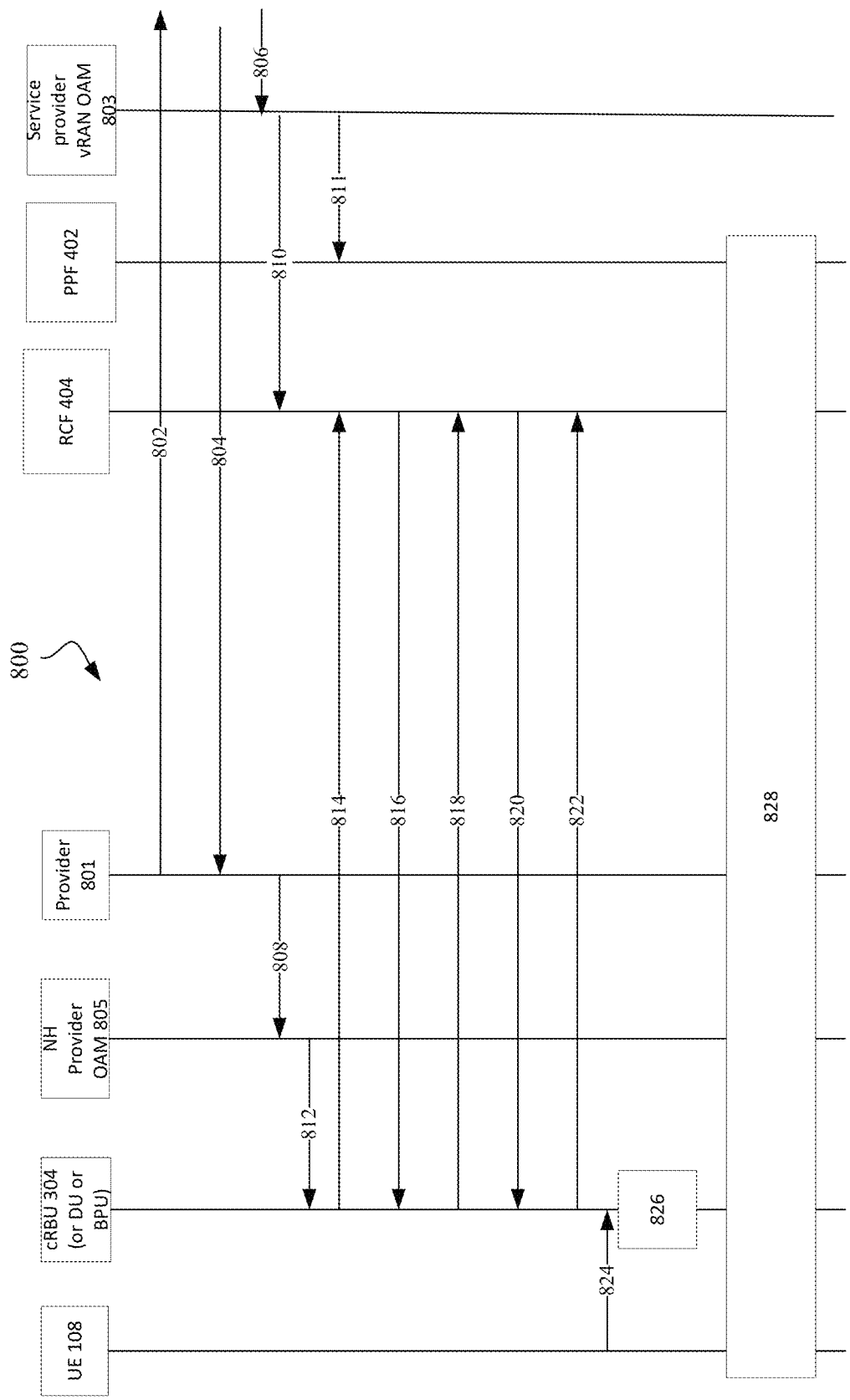
FIG. 8 illustrates a flow diagram of an implementation examples of the methods of FIGS. 6 and 7.

An exemplary implementation 800 of methods 600 and 700 is illustrated in FIG. 8 in a flow diagram. It should be noted that a cRBU 304 can be shared with or connected to a plurality vRANs.

First, a NH provider 801, which can offer its NH networks to operators to use, and a mobile service provider negotiate a service level agreement (steps 802 and 804). Once the SLA is reached and agreed, the service provider adds the SLA parameters to the vRAN operation administration and management (OAM) 803 of its network (step 806). The NH provider 801 does the same thing, i.e. it adds the SLA parameters to the OAM 805 of the NH network (step 808). Once the OAM 803 of the vRAN has received the SLA parameters, it sends the corresponding configurations to network nodes of the vRAN, such as the RCF 404 and PPF 402 (steps 810 and 811). Once the OAM 805 has received the SLA parameters, it sends the corresponding configurations to the network nodes of the NH network, such as the cRBU 304 (step 812).

Then, the cRBU 304 initiates the procedure to connect to a network node of the vRAN, such as the RCF 404, by sending a first message to the RCF 404, the first message comprising at least an identity of the NH network and some security information (step 814). The RCF 404 responds to the first message by sending a second message which may comprise an identity of the vRAN, some security information, protocol versions and vRAN capabilities and the SLA requirements (step 816). During this procedure, the RCF 404 and the cRBU 304 may also negotiate a common set of protocol versions and capabilities to be used between the cRBU 304 and the RCF 404 (step 818). They may also confirm the SLA requirements. It should be noted that, according to another embodiment, the RCF 404 could initiate the connection procedure with the cRBU 304, which will then respond to the message.

For example, in the same message as the second message or in a different message, the RCF 404 can also send a radio parameter to the cRBU 304. The radio parameter can be sent in a SIB2 or in a SIB. In addition, the RCF 404 can also send some service provider specific parameters to the cRBU 304, in a SIB2 and/or it may send other SIB parameters (step 820). The radio parameter could be a desired carrier frequency, a carrier bandwidth, a number of antenna ports, a desired Physical Cell Identity (PCI), a RACH preamble, etc.

In the same message as the first message or in a different message, the cRBU 304 can also send a radio parameter to the RCF 404. For example, the cRBU 304 can choose a specific cell to serve and sends the identity of the chosen cell to the RCF 404 with the first message using a Master information block (MIB) and SIB1, as an example (step 822). It may also send other parameters, such as a carrier frequency to use or ask for a carrier frequency to use. Alternatively, the cRBU 304 can decide to serve the cell that is indicated by the RCF 404 in the desired PCI. As such, the cRBU 304 sends the PCI to the RCF 404. The radio parameter can further comprise radio capabilities of the cRBU, detected cells, supported channels, etc.

Then, a connection can be established between the cRBU 304 and the particular RCF 404, based on the identity of the cRBU 304 and the identity of the RCF 404 (or vRAN) and at least one radio parameter from the RCF 404 or the cRBU 304. The cRBU 304 and the RCF 404 can use the same protocol version and capabilities and the SLA requirements to communicate with each other. Once the NH network is connected with the particular vRAN, a UE 108 can be connected to the cRBU 304 for communication services. To do so, the UE 108 requests a connection with the cRBU 304 (step 824). Upon receipt of the request, the cRBU 304 determines which cell the UE 108 is attaching to and which operator the UE 108 wants to receive service from (step 826). Then, a normal call can be set up between the UE 108, the cRBU 304 and the vRAN from the desired operator (step 828).

For each vRAN of a mobile network operator or different operators that shares the same cRBU, the above procedure is used to establish a connection with the NH network and each of the vRANs.

It should be noted that additional vRAN operators or service providers can create new cells on a same cRBU. For example, they can share radio resources (e.g. carrier frequency) or use their own private spectrum or use separate unlicensed spectrum. A service provider may control some actions on the cell, e.g. lock the cell, unlock the cell, modify the configuration, remove all service provider specific configuration and data from a cRBU 304 including security keys, etc., as long as it does not effect the operational state of other service providers that may be sharing the cell.

Figure 9:
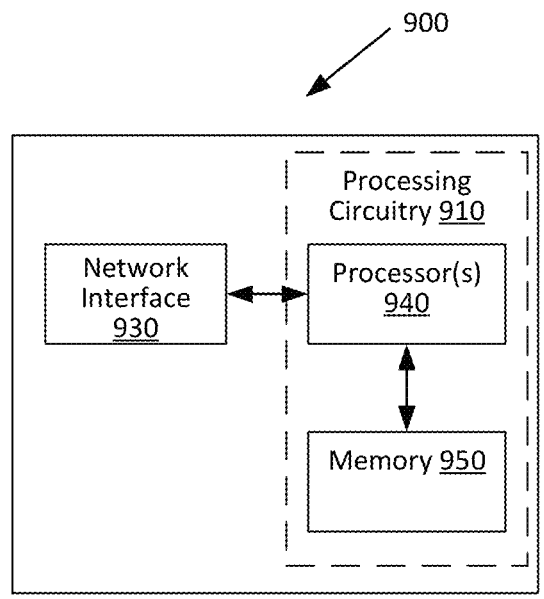
FIG. 9 illustrates a schematic diagram of a network node according to an embodiment.

Now, turning to FIG. 9, a schematic diagram of a network node 900 is illustrated. The network node 900 can be a DU 204 (e.g. BPU or cRBU 304) or a CU 202 (e.g. RCF/PPF), in accordance with certain embodiments, for example. The network node 900 includes a processing circuitry 910, and a network interface 930. The circuitry 910 may include one or more processors 940, and memory 950. The one or more processors 940 executes instructions to provide some or all of the functionalities described above as being provided by the cRBU/BPU or RCF/PPF, the memory 950 stores the instructions for execution by the one or more processors 940, and the network interface 930 communicates signals to backend network components, such as a gateway, switch, router, Internet, Public Switched Telephone Network (PSTN), core network nodes or radio network controllers, etc.

The one or more processors 940 may include any suitable combination of hardware and software implemented in one or more modules to execute instructions and manipulate data to perform some or all of the described functions of the cRBU/BPU or RCF/PPF, such as those described above. In some embodiments, the one or more processors 940 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 940 may comprise one or more of the modules discussed below with respect to FIGS. 10 and 11.

The memory 950 is generally operable to store instructions, such as a computer program, software, an application including one or more of logic, rules, algorithms, code, tables, etc. and/or other instructions capable of being executed by one or more processors 940. Examples of memory 950 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 930 is communicatively coupled to the one or more processors 940 and may refer to any suitable device operable to receive input for the cRBU or RCF, send output from the cRBU or RCF, perform suitable processing of the input or output or both, communicate to other devices, or any combination of the preceding. The network interface 930 may include appropriate hardware (e.g., port, modem, network interface card, etc.) and software, including protocol conversion and data processing capabilities, to communicate through a network.

Other embodiments of the network node 900 may include additional components beyond those shown in FIG. 9 that may be responsible for providing certain aspects of a network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Functionalities described may reside within the same radio node or network node or may be distributed across a plurality of radios nodes and network nodes.

Figure 10:
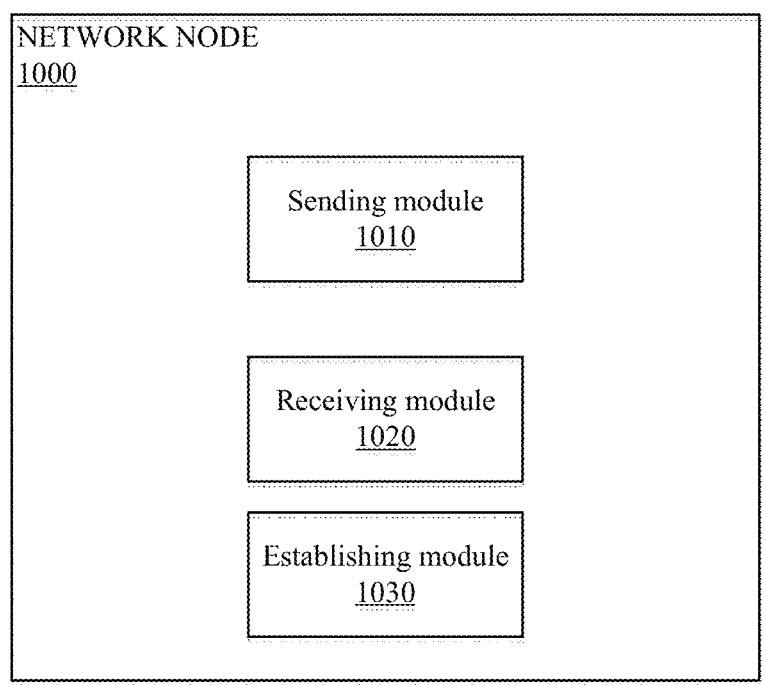
FIG. 10 illustrates a schematic diagram of a network node according to another embodiment.

FIG. 10 illustrates an example of a network node 1000 such as a DU (e.g. BPU or cRBU) in accordance with certain embodiments. The network node 1000 may include a sending module 1010, a receiving module 1020 and an establishing module 1030.

In certain embodiments, the sending module 1010 may perform a combination of steps that may include steps such as Steps 610 in FIG. 6.

In certain embodiments, the receiving module 1020 may perform a combination of steps that may include steps such as Step 620 in FIG. 6.

In certain embodiments, the establishing module 1030 may perform a combination of steps that may include steps such as Step 630 in FIG. 6.

In certain embodiments, the sending module 1010, receiving module 1020 and the establishing module 1030 may be implemented using one or more processors, such as described with respect to FIG. 9. The modules may be integrated or separated in any manner suitable for performing the described functionality.

Figure 11:
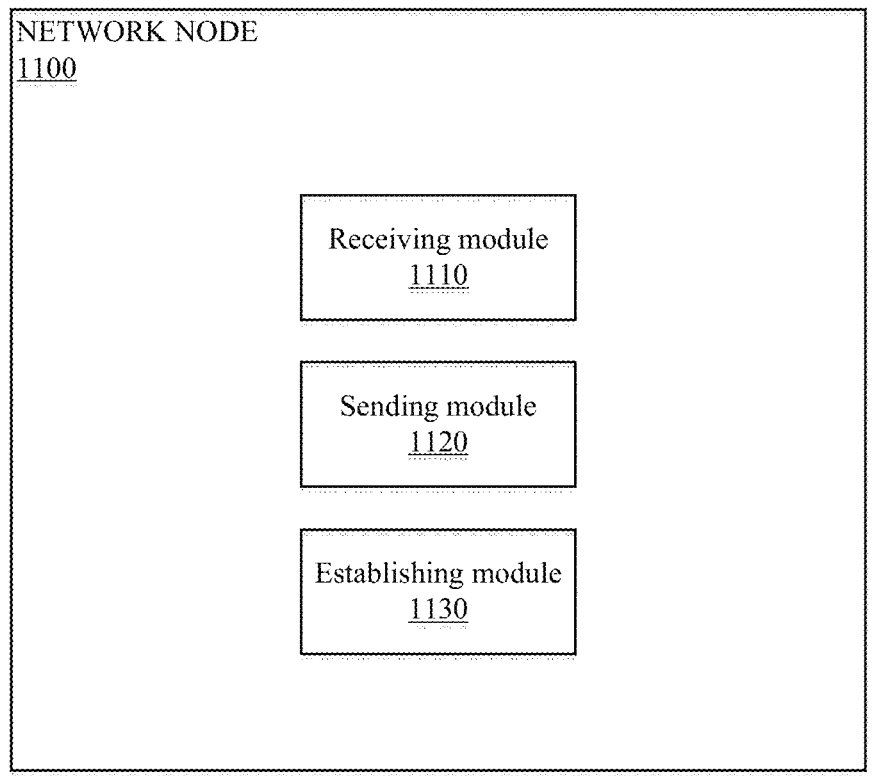
FIG. 11 illustrates a schematic diagram of a network node according to another embodiment.

FIG. 11 illustrates an example of another network node 1100 such as a CU 202 (e.g. the RCF and/or PPF), in accordance with certain embodiments. The network node 1100 may include a receiving module 1110, a sending module 1120 and an establishing module 1030.

In certain embodiments, the receiving module 1110 may perform a combination of steps that may include steps such as Step 710 in FIG. 7.

In certain embodiments, the sending module 1120 may perform a combination of steps that may include steps such as Step 720 in FIG. 7.

In certain embodiments, the establishing module 1130 may perform a combination of steps that may include steps such as Step 730 in FIG. 7.

In certain embodiments, the receiving module 1110, the sending module 1120 and the establishing module 1130 may be implemented using one or more processors, such as described with respect to FIG. 9. The modules may be integrated or separated in any manner suitable for performing the described functionality.

It should be noted that according to some embodiments, virtualized implementations of the DU 204 or BPU is possible, such as the cRBU 304, which is a cloud connected RBU. The RCF 404 and PPF 402 could be also virtualized. As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). The functions of the cRBU 304 and RCF 404 and PPF 402 are implemented at the one or more processors 940 or distributed across a cloud computing system. In some particular embodiments, some or all of the functions of the cRBU 304 and RCF 404 and PPF 402 are implemented as virtual components executed by one or more virtual machines implemented in a virtual environment(s) hosted by processing node(s).

Figure 12:
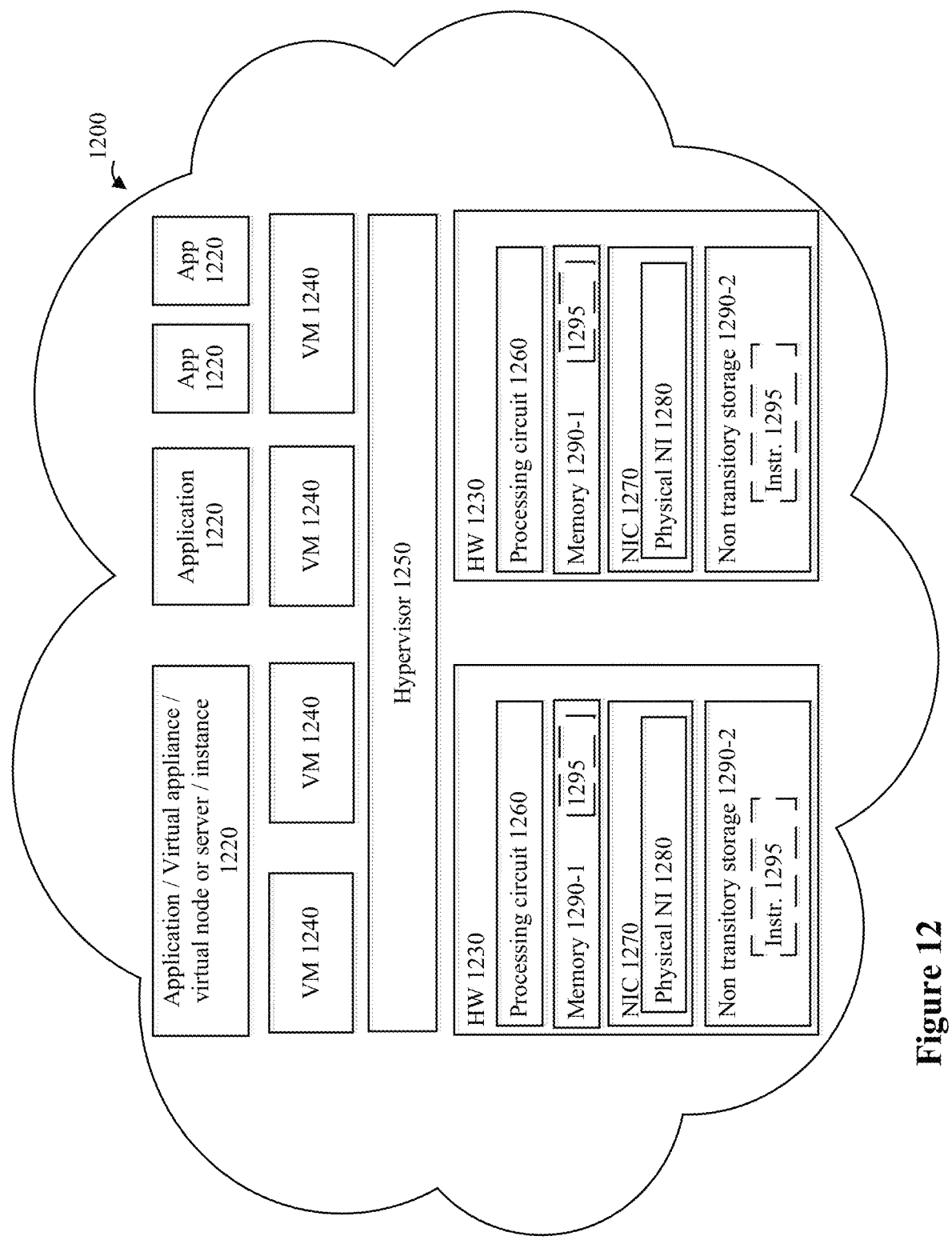
FIG. 12 illustrates a cloud computing environment for performing the methods of FIGS. 6 and 7.

For example, turning to FIG. 12, there is provided an instance or a virtual appliance 1220 implementing the methods or parts of the methods of some embodiments. The instance runs in a cloud computing environment 1200 which provides processing circuit 1260 and memory 1290. The memory contains instructions 1295 executable by the processing circuit 1260 whereby the instance 1220 is operative to execute the methods or part of the methods previously described in relation to some embodiments.

The comprises a general-purpose network device including hardware 1230 comprising a set of one or more processor(s) or processing circuits 1260, which may be commercial off-the-shelf (COTS) processors, dedicated Application Specific Integrated Circuits (ASICs), or any other type of processing circuit including digital or analog hardware components or special purpose processors, and network interface controller(s) 1270 (NICs), also known as network interface cards, which include physical Network Interface 1280. The general-purpose network device also includes non-transitory machine readable storage media 1290-2 having stored therein software and/or instructions 1295 executable by the processor 1260. During operation, the processor(s) 1260 execute the software/instructions 1295 to instantiate a hypervisor 1250, sometimes referred to as a virtual machine monitor (VMM), and one or more virtual machines 1240 that are run by the hypervisor 1250.

A virtual machine 1240 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1240, and that part of the hardware 1230 that executes that virtual machine, be it hardware dedicated to that virtual machine and/or time slices of hardware temporally shared by that virtual machine with others of the virtual machine(s) 1240, forms a separate virtual network element(s) (VNE).

The hypervisor 1250 may present a virtual operating platform that appears like networking hardware to virtual machine 1240, and the virtual machine 1240 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual appliance 1220 may be implemented on one or more of the virtual machine(s) 1240, and the implementations may be made differently.

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description, which is defined solely by the appended claims.

The present description may comprise one or more of the following abbreviation:

ARQ Automatic Repeat Request
AWGN Additive White Gaussian Noise
BCCH Broadcast Control Channel
BCH Broadcast Channel
CA Carrier Aggregation
CCCH SDU Common Control Channel SDU
CDMA Code Division Multiplexing Access
CGI Cell Global Identifier
CP Cyclic Prefix
CPICH Common Pilot Channel
CPICH Ec/No CPICH Received energy per chip divided by the power density in the band
CQI Channel Quality information
C-RNTI Cell RNTI
CSI Channel State Information
DCCH Dedicated Control Channel
DL Downlink
DRX Discontinuous Reception
DTX Discontinuous Transmission
DTCH Dedicated Traffic Channel
DUT Device Under Test
E-CID Enhanced Cell-ID (positioning method)
ECGI Evolved CGI
ED Energy Detect
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
GSM Global System for Mobile communication
HARQ Hybrid Automatic Repeat Request
HO Handover
HSPA High Speed Packet Access
HRPD High Rate Packet Data
LPP LTE Positioning Protocol
MAC Medium Access Control
MBMS Multimedia Broadcast Multicast Services
MBSFN Multimedia Broadcast multicast service Single Frequency Network
MBSFN ABS MBSFN Almost Blank Subframe
MDT Minimization of Drive Tests
MIB Master Information Block
MME Mobility Management Entity
MO Multi-Operator
NF Noise Floor
NH Neural Host
NPDCCH Narrowband Physical Downlink Control CHannel
NR New Radio
OCNG OFDMA Channel Noise Generator
OFDM Orthogonal Frequency Division Multiplexing
OFDMA Orthogonal Frequency Division Multiple Access
OSS Operations Support System
O&M Operation and Mainatenance
PBCH Physical Broadcast Channel
P-CCPCH Primary Common Control Physical Channel
PCell Primary Cell
PCFICH Physical Control Format Indicator CHannel
PDCCH Physical Downlink Control CHannel
PDSCH Physical Downlink Shared Channel
PGW Packet Gateway
PHICH Physical Hybrid-ARQ Indicator CHannel
PLMN Public Land Mobile Network
PMI Precoder Matrix Indicator
PRACH Physical Random Access CHannel
PRS Positioning Reference Signal
PUCCH Physical Uplink Control CHannel
PUSCH Physical Uplink Shared Channel
RLM Radio Link Management
RRC Radio Resource Control
RSCP Received Signal Code Power
RSRP Reference Signal Received Power
RSRQ Reference Signal Received Quality
RSSI Received Signal Strength Indicator
RSTD Reference Signal Time Difference
QAM Quadrature Amplitude Modulation
RACH Random Access Channel
RAT Radio Access Technology
RNC Radio Network Controller
RNTI Radio Network Temporary Identifier
RRC Radio Resource Control
RRM Radio Resource Management
SCH Synchronization Channel
SCell Secondary Cell
SDU Service Data Unit
SFN System Frame Number
SGW Serving Gateway
SI System Information
SIB System Information Block
SNR Signal Noise Ratio
SON Self Optimized Network
TDD Time Division Duplex
TTI Transmission Time Interval UE User Equipment
UL Uplink
UMTS Universal Mobile Telecommunication System
UTRA Universal Terrestrial Radio Access
UTRAN Universal Terrestrial Radio Access Network
WCDMA Wide CDMA
WLAN Wireless Local Area Network

What is claimed is:

1. A method for establishing a connection between a distributed unit (DU) of a network node and a central unit (CU) of the network node, under a service level agreement (SLA) therebetween, the method performed by the DU and comprising:
   determining a cell to serve;
   sending, by the DU, a message to a radio control function (RCF) of the CU, the message including an identity of the DU and at least a request for the determined cell to serve;
   in response to the message, receiving, at the DU from the RCF, an identity of the CU and a cell identity corresponding to the determined cell; and
   establishing the connection between the DU and CU based at least on the identity of the DU, the identity of the CU and the identity of the determined cell.

2. The method of claim 1, wherein the request for the determined cell to serve comprises a Master Information Block (MIB) containing an identity of the determined cell.

3. The method of claim 1, wherein receiving the cell identity corresponding to the determined cell comprises receiving a Physical Cell Identity (PCI).

4. The method of claim 1, further comprising sending, by the DU, a request to the RCF of the CU for a carrier frequency to use by the DU for communication by one or more operator networks.

5. The method of claim 4, further comprising receiving, at the DU an acknowledgement from the RCF to use the requested carrier frequency for the communication by the one or more operator networks.

6. The method of claim 1, wherein the message further comprises security information.

7. The method of claim 1, further comprising negotiating a common set of protocol versions and capabilities to be used between the DU and the CU.

8. The method of claim 7, wherein, after the connection is established, using the common set of protocol versions and capabilities to communicate with the CU.

9. The method of claim 1, wherein the sending by the DU, the message to a radio control function (RCF) and the receiving at the DU from the RCF, the identity of the CU are performed over an F1 interface between the DU and CU.

10. The method of claim 1, further comprising receiving a connection request from a User Equipment (UE).

11. The method of claim 10, in response to the receipt of the connection request, establishing the connection with the UE based on a cell to which the UE is attached.

12. A Distributed Unit (DU) of a network node comprising processing circuitry, which comprises a processor and a memory, the memory containing instructions that, when executed by the processor, cause the DU to:
    determine a cell to serve;
    send, from the DU, a message to a radio control function (RCF) of a Central Unit (CU) of the network node, the message including an identity of the DU and at least a request for the determined cell;
    in response to the message, receive, at the DU from the RCF, an identity of the CU and a cell identity corresponding to the determined cell; and
    establish the connection between the DU and CU based on the identity of the DU, the identity of the CU, and the identity of the determined cell.

13. The DU of claim 12, wherein the request for the determined cell to serve comprises a Master Information Block (MIB) containing an identity of the determined cell.

14. The DU of claim 12, wherein the processor is configured to receive the cell identity of the determined cell, wherein receiving the cell identity corresponding to the determined cell comprises receiving a physical cell identity (PCI).

15. The DU of claim 12, wherein the processor is further configured to send a request to the RCF of the CU for a carrier frequency to use by the DU for communication by one or more operator networks.

16. The DU of claim 12, wherein the message further comprises security information.

17. The DU of claim 12, wherein the processor is configured to negotiate a common set of protocol versions and capabilities to be used between the DU and the CU.

18. The DU of claim 12, wherein the processor is configured to send from the DU, the message to the RCF of the CU, and receive at the DU from the RCF, the identity of the CU over an F1 interface between the DU and CU.

19. The DU of claim 12, wherein the processor is configured to receive a connection request from a User Equipment (UE).

20. The DU of claim 19, wherein the processor is configured to, in response to the receipt of the connection request, establish the connection with the UE based on a cell to which the UE is attached.

* * * * *